July 24, 1956 M. J. WETZ 2,755,944
LOADER DEVICES ON TRACTORS
Filed March 11, 1954 2 Sheets-Sheet 1
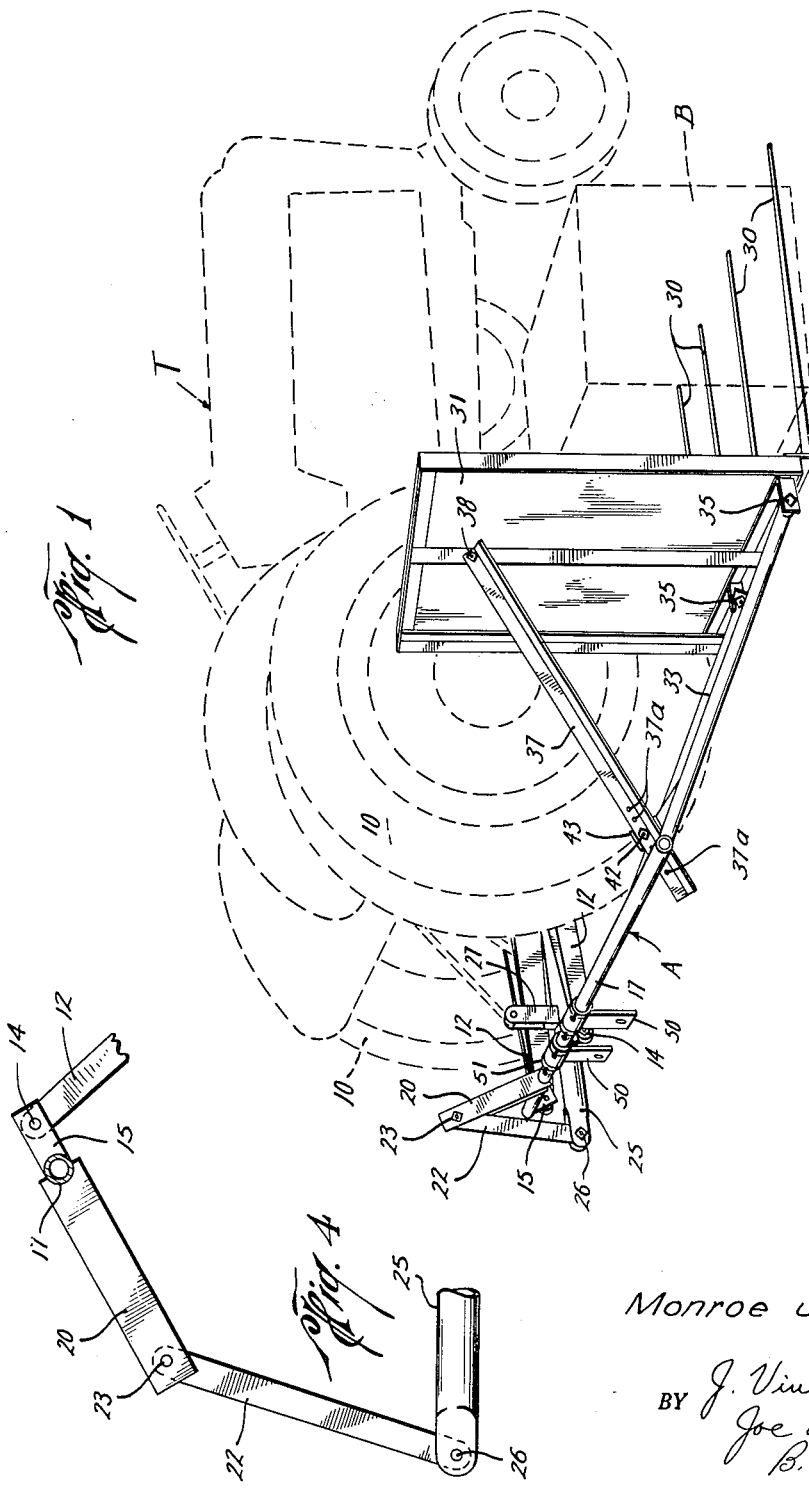
Monroe J. Wetz
INVENTOR.
BY J. Vincent Martin
Joe E. Edwards
B. R. Pravel
ATTORNEYS

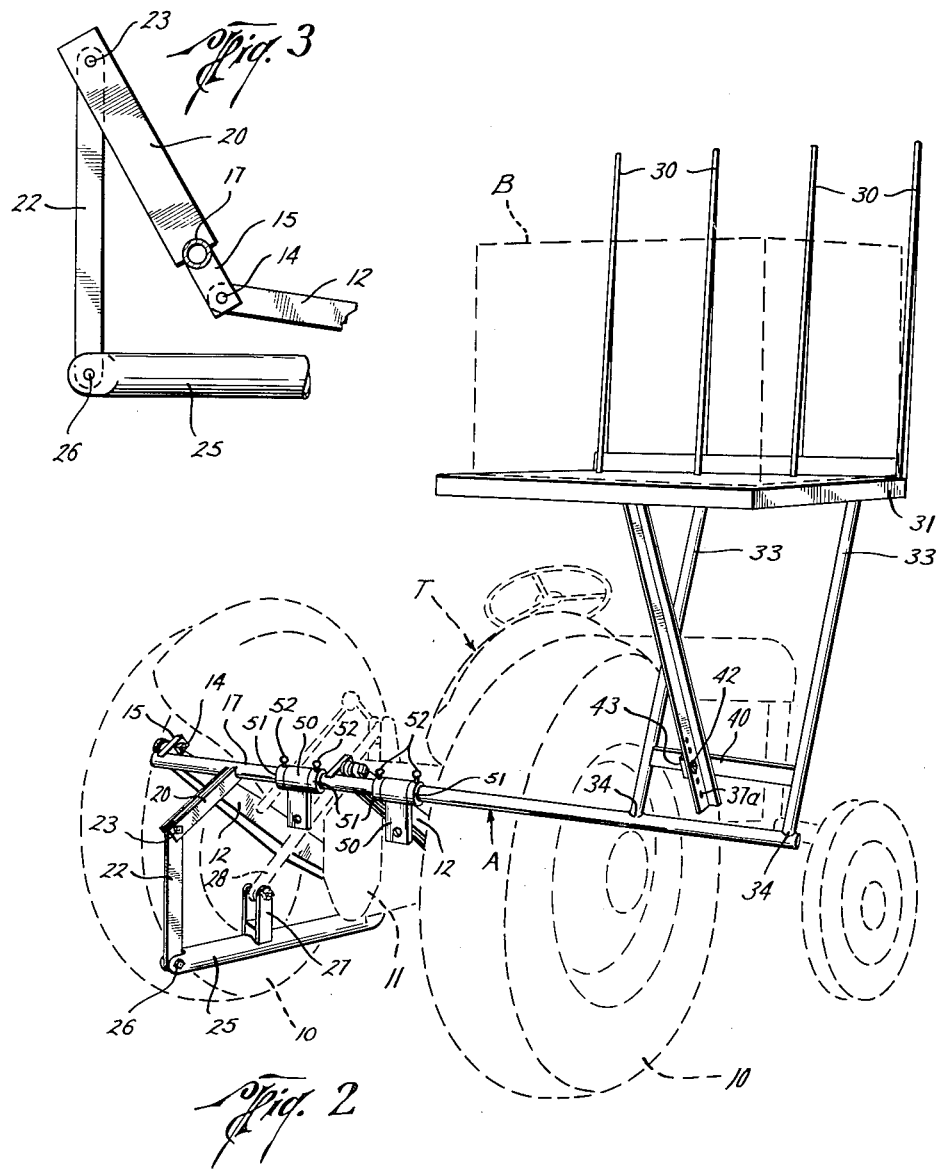

United States Patent Office 2,755,944
Patented July 24, 1956

2,755,944
LOADER DEVICES ON TRACTORS
Monroe J. Wetz, San Antonio, Tex.

Application March 11, 1954, Serial No. 415,497

9 Claims. (Cl. 214—131)

This invention relates to new and useful improvements in loader devices on tractors.

An object of this invention is to provide a new and improved loader device which is adapted to be mounted on a conventional tractor having the usual hydraulic lift mechanism whereby a bale of hay or similar object can be picked up by said device during the forward motion of the tractor and can also be raised to a loading position.

An important object of this invention is to provide a new and improved loader device for use with a tractor, wherein said device has a means for picking up and raising a bale of hay or a similar object from the ground level to a point thereabove, said means being positioned outwardly from the rear wheels of the tractor whereby a trailer may be connected to the rear of the tractor so that the bales of hay or other objects can be picked up by said loader device and loaded into said trailer while the tractor and the trailer are moving forwardly.

Another object of this invention is to provide a new and improved loader device on a tractor, including a pick-up means for picking up a bale of hay or a similar object, and means for pivoting the pick-up means for lifting the bale or other object upwardly through an arc of substantially ninety degrees, whereby the bale or other device is moved from a substantially horizontal position at ground level to a substantially horizontal position thereabove so that the bale or other object may be dumped or manually loaded into a trailer or other similar receiving structure.

A further object of this invention is to provide a new and improved loader device for loading bales of hay or similar objects, wherein said device is operated by a conventional hydraulic lift mechanism such as is found on the usual farm tractors, and wherein the lift arms of such a mechanism transmit a lifting force to said device for lifting and rotating a pick-up means on said device to thereby lift and rotate the bale of hay or other object for the loading of same.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is an isometric view of the loader device of this invention on a tractor, and illustrating the loader device in its lower position for picking up a bale of hay or similar object.

Figure 2 is an isometric view similar to Figure 1, but illustrating the loader device of this invention in a raised or elevated position for dumping or unloading the hay bale or other object therefrom.

Figure 3 is an elevation, partly in section, and illustrating a fragment of the loader device of this invention to show the relationship between the linkage and the lift arms when the device is in its lower position of Figure 1.

Figure 4 is a view similar to Figure 3, but illustrating the relative position of the linkage and the lift arms when the device is in the raised position of Figure 2.

In the drawings, the letter A designates generally the loader device of this invention (shown in solid lines in Figures 1 and 2) which is adapted to be connected to and operated by a conventional hydraulic lift mechanism or system found on the usual tractors T such as the Ford and Ferguson farm tractors (shown in dotted lines in Figures 1 and 2). As will be explained, the loader device A is so constructed that a bale of hay B or similar object may be picked up from the ground or ground level and raised to a point thereabove (Figure 2) for dumping or unloading the bale B or other object into a trailer connected to the rear of the tractor T, a truck alongside the tractor T, or other similar receiving structure.

Extending from the rear of the tractor T and between the rear wheels 10 thereof are lift arms 12, each of which is movable in a vertical plane by the usual or conventional hydraulic lift mechanism or system (not shown) of the tractor T. The extent of the vertical movement of such lift arms 12 is limited, with the arms 12 being shown in substantially their lowermost position in Figure 1 and in substantially their uppermost position in Figure 2. The outer end of each of the arms 12 is connected to a pin or bolt 14 which extends through an opening in the outer end of each lift arm 12 and through an opening in a lug 15 which is welded or otherwise secured to a laterally extending pipe or bar 17 which extends substantially perpendicular to the lift arms 12.

Each bolt or pin 14 may be rigidly connected to each lug 15 so long as the bolt or pin 14 permits the arm 12 to pivot thereon. Thus, each of the arms 12 is pivotally connected to the pipe 17 so that as the arms 12 are raised and lowered, a rotative force is applied to the rod or bar 17.

To assure the rotation of the pipe or bar 17 and to also control the extent of such rotation during the lowering and raising of the lift arms 12, a control linkage is provided which includes a forward link arm 20 which is welded or otherwise secured to the pipe or bar 17, and a rear link arm 22 which is pivotally connected at its upper end to the link arm 20 by a bolt or pivot pin 23. The lower end of the rear link arm 22 is pivotally connected to a draw bar hitch or rod 25 at a bolt or pin 26 which provides the pivotal connection therebetween. The forward end of the draw bar hitch or rod 25 is welded or otherwise securely fixed to the body 11 of the tractor T (Figure 2). Thus, the draw bar hitch or rod 25 is securely held against movement, but the link arms 20 and 22 are free to pivot for controlling the rotation of the pipe or bar 17 during the lowering and raising thereof by the lift arm 12, as will be explained. A bracket 27 welded or otherwise affixed to the draw-bar hitch 25 for connection with the center linkage of 28 of the hydraulic lift system, but it will be understood that such linkage does not in any way transmit or cause the draw-bar hitch or rod 25 to move.

As shown in the drawings, the pipe or bar 17 extends outwardly of the right rear wheel 10, although it will be appreciated from the following description that the pipe or rod 17 could extend outwardly of the left rear wheel 10 if desired instead of as shown in the drawings. The pick-up means for lifting the bale B or other object is mounted at the outer end of the pipe or bar 17 which extends outwardly of the right rear wheel 10. As shown in the drawings, such pick-up means includes a receiving platform formed by fork members or prongs 30 which are laterally spaced from each other and are substantially horizontal when the loader device A is in its lower position (Figure 1). The fork members or prongs 30 are bolted or otherwise secured to a back platform 31 which is substantially perpendicular to the fork member or prongs 30. The fork members or prongs 30 and the back platform 31 together may be termed a loading unit of the pick-up means. Such unit is connected to the pipe or bar 17 by support pipes 33 which are laterally spaced from each other and have their rear ends welded at 34 to the pipe 17 and their forward ends pivotally connected to the back platform 31 by bolts or pivot pins 35. Such support pipes 33 extend downwardly at an angle to the horizontal or ground when the loader device A is in its lower position (Figure 1). To further support the loading unit which includes the back platform 31 and the fork members or prongs 30, and to adjust their position relative to the ground or horizontal, an adjustable support brace 37 is connected at its forward end to the platform 31 by a bolt 38 and its rear end to a laterally extending brace 40 by a bolt 42. The laterally extending brace 40 extends between the substantially parallel support pipes 33 and is welded or otherwise secured thereto. A lug or bracket 43 extends upwardly from the brace 40 and has an opening therethrough for receiving the bolt 42 which extends through one of the openings 37a in the adjustable support brace 37. By positioning the bolt 42 in an opening 37a other than the one illustrated in the drawings, it will be evident that the position of the loading unit may be adjusted or changed. For example, although it is preferred to pick up the bales B or other objects from the ground, in some instances it may be desirable to pick up such bales B or other objects from a level slightly above the ground and in such case the angle of the prongs 30 with respect to the ground could be changed by the adjustment of the adjustable support brace 37. Of course, when the bolt 42 is in place, the platform 31 and the prongs 30 are rigidly held against movement except such movement as may occur by the rotation of the pipe or bar 17.

One of the important advantages of the loader device A of this invention is that it is adapted to be used while the tractor T is moving forwardly while at the same time permitting a loading of the bale B or other object into a trailer or other receiving structure (not shown) being pulled at the rear of the tractor T. For connecting such a trailer or other receiving structure to the rear of the tractor T, connecting brackets 50 are pivotally mounted on the pipe or bar 17 at a point between the rear wheels 10 and to one side of the forward link arm 20. Such brackets 50 can be moved along the pipe or bar 17 to various positions thereon and are preferably retained against movement during use by retaining collars 51 disposed on each side of each of the brackets 50. Each of the retaining collars 51 is also slidable on the pipe or bar 17, but each is provided with a set screw 52 for securing the collar 51 in a fixed position on the pipe or bar 17 to thereby limit the sliding movement of the connecting brackets 50 along the pipe or bar 17 during use.

In the operation or use of the loader device A of this invention, the bale B or other object is preferably picked up as the tractor T moves forwardly with the device A in its lower position (Figure 1). The prongs or fork members 30 slide beneath the bale B or other object to position the bale B or other object thereon. During such loading, the prongs 30 are preferably substantially parallel to the ground and are in contact therewith, although it will be evident that the prongs 30 may be elevated above ground level for picking up objects from a low platform or the like. Also, generally the rear ends of the prongs 30 are elevated slightly above the forward ends thereof, so that the bale B or other object slides slightly upwardly as it is seated thereon. Of course, in some instances, the bale B may be loaded manually onto the prongs 30.

After the bale B is in position on the prongs 30, the hydraulic lift mechanism of the tractor T is actuated to raise the lift arms 12 vertically upwardly from the position shown in Figure 1 to that shown in Figure 2. During such upward movement of the lift arms 12, they pivot about the pivot pins or bolts 14 and transmit a rotational force to the pipe or bar 17 in a counter-clockwise direction (Figures 3 and 4). It will be evident, however, that with the weight of the bale B or other object on the prongs 30, such weight will tend to cause the pick-up means (including back platform 31 and prongs 30) to swing downwardly and thereby rotate the rod 17 clockwise (as viewed in Figures 3 and 4). Therefore, if it were not for the control linkage (including link arms 20 and 22) the tendency of the rod 17 to rotate clockwise by the weight of the object such as bale B might be sufficiently great to overcome the counter-clockwise rotative force applied to the rod 17 by the upward movement of the lift arms 12. Since the link arms 20 and 22 of the control linkage are connected between the rod 17 and the hitch 25, as the upward lifting force is applied to the rod 17, the rod 17 is forced to rotate in a counter-clockwise direction because as the rod 17 is raised the link arm 20 must swing downwardly to permit such raising, and of course the downward swinging of the link arm 20 turns the rod 17. Preferably the link arms 20 and 22 are so positioned that the link arm 20 extends upwardly and slightly rearwardly from the rod 17. The lugs 15 also preferably extend downwardly and forwardly, because if the lift arms 12 were directly under the rod 17 and the link arm 20 extended vertically in the lower position (Figure 1), the rod 17 could become locked against upward movement.

The extent of rotation is also controlled within limits by the forward link 20 and the rear link 22. As the pipe or bar 17 is rotated, the pick-up means, including the prongs 30 and the back platform 31, are likewise rotated to move the back platform 31 from its substantially vertical position in Figure 1 to a substantially horizontal position (Figure 2). When the loader device A has reached its upper position, the weight of the bale B or other object will then be shifted to the back platform 31 and it will, therefore, be evident that the pick-up means, as well as the bale B, has been rotated or turned through an arc of substantially ninety degrees (90°). If it is desired to dump the bale B or other object from the back platform 31 into a trailer or other receiving structure therebelow, the device can be rotated through an arc of greater than ninety degrees so that the back platform 31 is inclined slightly downwardly at its rear portion when the platform 31 is in its upper position (Figure 2). To obtain a maximum turning of the pick-up means, the arm 20 is secured to the rod 17 in a nearly vertical position when the device A is in its lower position. Of course, the extent of rotation is limited as a practical matter by the limits of the vertical travel of the lift arms 12. If a lesser turning of the pick-up means within the limits of travel of the lift arms 12 is desired, the arm 20 can be positioned more rearwardly from a nearly vertical position when the device A is in its lower position.

In the usual case, a trailer or similar receiving structure is connected to the connecting brackets 50 and is pulled by the tractor T so that the bale B or other object is dumped or manually loaded into the trailer. Such loading can be accomplished while the tractor T is in forward motion. It is thus possible to pick up a large number of objects without stopping the motion of the tractor T. It will be appreciated, of course, that such loading could be accomplished while the tractor T is standing still.

After the bale B is loaded into the trailer or other receiving structure, the lift arms 12 are lowered by reversing the hydraulic lift mechanism on the tractor T. During such lowering movement the rotation of the pipe or bar 17 is again controlled by the control linkage, including the forward link 20 and the rear link 22, so that the pick-up means, including the prongs 30 and platform 31, are lowered uniformly from the position shown in Figure 2 to that shown in Figure 1, whereby another bale B or other object can be picked up and the above operation repeated.

Although a bale B having a square cross-sectional area is illustrated in the drawings, it will be evident that other objects, such as bales of hay having a round or cylindrical shape, as well as boxes and drums and similar objects having various shapes, may be handled by the loader device A of this invention. Although the loader device A is particularly adaptable for use with a trailer or other receiving structure being pulled behind the tractor T, such device A can also be conveniently used in connection with a truck moving alongside the tractor T outwardly from the pick-up means, or, in some instances, the loading may be to a fixed platform.

From the foregoing, it is believed apparent that a loader device is provided which is adapted to be attached to the usual lift mechanism of conventional tractors, and that the device is particularly suitable for loading bales of hay or other objects while the tractor is moving forwardly.

The foregoing disclosure and description of the invention is illustrative and explanatory thereof and various changes in the size, shape and materials, as well as in the details of the illustrated construction, may be made, within the scope of the appended claims, may be made, without departing from the spirit of the invention.

What is claimed is:

1. A loader device adapted to be mounted on a tractor having a lift mechanism with lift arms movable vertically by said mechanism from a substantially horizontal position, comprising a pick-up means positioned outwardly of the tractor and being adapted to pick up an object alongside the tractor, and means connecting said pick-up means with said lift arms for moving said pick-up means and the object upwardly and rearwardly as said lift arms are raised upwardly from said substantially horizontal position to thereby move said object to a position for loading same rearwardly of the tractor.

2. A loader device adapted to be used on a tractor having a hydraulic lift mechanism with lift arms movable vertically by said mechanism from a substantially horizontal position, including a pick-up means positioned outwardly of the rear wheels of the tractor and being adapted to pick up an object alongside the tractor as said tractor moves forwardly, and means connecting said pick-up means with said lift arms for raising and turning said pick-up means as said lift arms are raised upwardly from said substantially horizontal position to thereby raise and turn the object on the pick-up means to a position for loading the object rearwardly of the tractor.

3. A loader device adapted to be mounted on a tractor having an hydraulic lift mechanism with lift arms extending rearwardly on the tractor between the rear wheels thereof, including an operating rod positioned at the rear of the tractor wheels and transversely thereto with a portion of the rod extending outwardly of one of said rear wheels, means having a portion thereof connecting said rod to said lift arms for effecting a turning of said rod upon a vertical movement of said lift arms, pick-up means attached to said portion of said rod extending outwardly of said one of the rear wheels, and adapted to be raised from a lower position at substantially ground level and turned during such raising through an arc of about ninety degrees as said rod is turned, whereby an object on the pick-up means is adapted to be raised from a position at ground level to a position thereabove with the object being turned to facilitate unloading of same into a receiving structure above ground level, and means for controlling said turning at all positions of said rod during said turning whereby the height of said pick-up means during unloading is controllable.

4. The structure set forth in claim 3, including a connecting bracket pivotally mounted on said rod for attaching a trailer to said rod and behind the rear wheels of the tractor for receiving the object picked up by said pick-up means when said pick-up means is in its raised position.

5. The device set forth in claim 1, wherein said means connecting said pick-up means with said lift arms includes, a rod extending laterally relative to said lift arms, means connecting said rod to said lift arms, and a control linkage connected between a part of the tractor and said rod for effecting the rotation of said rod as said rod is lifted by the lifting of said lift arms.

6. The device set forth in claim 2, wherein said means connecting said pick-up means with said lift arms includes a rod extending laterally relative to said lift arms, means connecting said rod to said lift arms, and a control linkage connected between a part of the tractor and said rod for effecting the rotation of said rod as said rod is lifted by the lifting of said lift arms.

7. A loader device adapted to be mounted on a tractor having an hydraulic lift mechanism with lift arms extending rearwardly on the tractor between the rear wheels thereof, including an operating rod positioned at the rear of the tractor wheels and transversely thereto with a portion of the rod extending outwardly of one of said rear wheels, means having a portion thereof connecting said rod to said lift arms for effecting a turning of said rod upon a vertical movement of said lift arms, pick-up means attached to said portion of said rod extending outwardly of said one of the rear wheels, and adapted to be raised from a lower position at substantially ground level and turned during such raising through an arc of about ninety degrees as said rod is turned, whereby an object on the pick-up means is adapted to be raised from a position at ground level to a position thereabove with the object being turned to facilitate unloading of same into a receiving structure above ground level, said means connecting said rod to said lift arms including lugs secured to said rod and projecting therefrom, and pivot members pivotally connecting said lugs to said lift arms, said lugs extending downwardly and forwardly when said pick-up means is in its lower position, whereby a rotational force is imparted to the lugs and the rod during the vertical movement of the lift arms.

8. A loader device adapted to be mounted on a tractor having an hydraulic lift mechanism with lift arms extending rearwardly on the tractor between the rear wheels thereof and also having a rearwardly extending draw bar hitch firmly secured to the tractor and extending between the rear wheels thereof, including an operating rod positioned at the rear of the tractor wheels and transversely thereto with a portion of the rod extending outwardly of one of said rear wheels, means having a portion thereof connecting said rod to said lift arms for effecting a turning of said rod upon a vertical movement of said lift arms, pick-up means attached to said portion of said rod extending outwardly of said one of the rear wheels, and adapted to be raised from a lower position at substantially ground level and turned during such raising through an arc of about ninety degrees as said rod is turned, whereby an object on the pick-up means is adapted to be raised from a position at ground level to a position thereabove with the object being turned to facilitate unloading of same into a receiving structure above ground level, said means for effecting the turning of said rod including, a control linkage for controlling the rotation of the rod, a first link arm connected to the rod, and a second link arm pivotally connected to the first link arm and the draw bar hitch, said first link arm extending substantially vertically when said pick-up means is in its lower position.

9. A loader device adapted to be mounted on a tractor having an hydraulic lift mechanism with lift arms extending rearwardly on the tractor between the rear wheels thereof, including an operating rod positioned at the rear of the tractor wheels and transversely thereto with a portion of the rod extending outwardly of one of said rear wheels, means having a portion thereof connecting said rod to said lift arms for effecting a turning of said rod upon a vertical movement of said lift arms, pick-up means attached to said portion of said rod extending outwardly of said one of the rear wheels, and adapted to be raised from a lower position at substantially ground level and turned during such raising through an arc of about ninety degrees as said rod is turned, whereby an object on the pick-up means is adapted to be raised from a position at ground level to a position thereabove with the object being turned to facilitate unloading of same into a receiving structure above ground level, said pick-up means including a loading unit having a receiving platform, a back platform, and means for adjusting the angle of said receiving platform with respect to the ground.

References Cited in the file of this patent

UNITED STATES PATENTS

| | | |
|---|---|---|
| 1,786,608 | Halstead | Dec. 30, 1930 |
| 1,905,476 | Lorenz | Apr. 25, 1933 |
| 2,634,003 | Williamson et al. | Apr. 7, 1953 |
| 2,668,630 | Ertl | Feb. 9, 1954 |